United States Patent Office 3,330,835
Patented July 11, 1967

3,330,835
NOVEL 1,3,4,5-TETRAHYDROPYRROLO
[4,3,2-de] QUINOLINES
Jackson B. Hester, Jr., Portage, Mich., assignor to The Upjohn Company, Kalamazoo, Mich., a corporation of Delaware
No Drawing. Filed Feb. 10, 1964, Ser. No. 343,493
7 Claims. (Cl. 260—287)

The present invention relates to novel organic compounds and is more particularly concerned with novel 1,3,4,5-tetrahydropyrrolo[4,3,2-de]quinolines, and acid addition and quaternary ammonium salts thereof.

The novel 1,3,4,5-tetrahydropyrrolo[4,3,2-de]quinolines of the present invention can be represented by the formula:

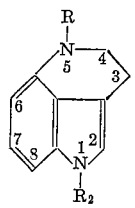

I wherein R represents hydrogen,

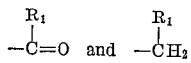

wherein $R_1$ represents hydrogen and alkyl of one to three carbon atoms, inclusive, e.g., methyl, ethyl, propyl, and isopropyl and $R_2$ represents hydrogen and alkyl of one to four carbon atoms, inclusive, e.g., methyl, ethyl, propyl, isopropyl, butyl, isobutyl, and the like.

The novel 1,3,4,5-tetrahydropyrrolo[4,3,2-de]quinoline (R and $R_2$ of Formula I=hydrogen) of the present invention can be prepared by concomitantly reducing and cyclizing 4-nitro-3-indoleacetonitrile having the formula:

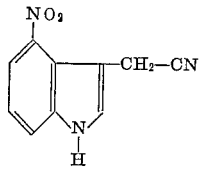

II utilizing hydrogen and a hydrogenation catalyst in the presence of an inert organic solvent. Suitable catalysts include noble metal catalysts, e.g., platinum and palladium, and base metal catalysts, e.g., Raney nickel.

For this reaction, palladium catalysts are generally preferred, e.g., palladium black, palladium-barium sulfate, palladium-charcoal, and the like. Inert organic solvents suitable for the reaction include, e.g., ethyl acetate, methanol, ethanol, isopropanol, and the like. In the reaction, hydrogen pressures can range from slightly under atmospheric to about two to four atmospheres although higher pressures can also be used.

The reaction is carried out at a temperature between about 15° C. and about 100° C., but it is preferred that the reaction be initially carried out at a temperature between about 15° C. and about 35° C. and then raised to between about 60° C. and about 100° C. The novel 1,3,4,5-tetrahydropyrrolo[4,3,2-de]quinoline of the present invention can then be separated from the reaction mixture utilizing conventional procedures, e.g., filtration to remove the catalyst followed by chromatography and recrystallization.

The starting 4-nitro-3-indoleacetonitrile can be prepared by reacting 4-nitrogramine (Gazz. chim. ital. 90, 525, 1960) in an organic solvent, e.g., tetrahydrofuran, with dimethyl sulfate, recovering the resulting 4-nitrogramine methosulfate, and reacting the 4-nitrogramine methosulfate with sodium cyanide.

The 1,3,4,5-tetrahydropyrrolo[4,3,2-de]quinolines having the formula:

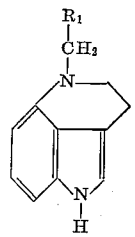

III wherein $R_1$ has the value represented above, can be prepared by reacting 1,3,4,5-tetrahydropyrrolo[4,3,2-de]quinoline with an alkanoic anhydride, e.g., formic acetic anhydride, acetic anhydride, propionic anhydride, isobutyric anhydride, and the like, to produce a 1,3,4,5-tetrahydropyrrolo[4,3,2-de]quinoline having the formula:

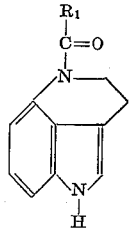

IV whterin $R_1$ has the value represented above, and reducing the 1,3,4,5 - tetrahydropyrrolo[4,3,2 - de]quinoline (Formula IV) with a reducing agent, e.g., lithium aluminum hydride, lithium borohydride, and the like, with lithium aluminum hydride being preferred. The reduction is carried out in the presence of an inert organic solvent, e.g., tetrahydrofuran, diisopropyl ether, diethyl ether, N-methylmorpholine, dioxane, and the like, with tetrahydrofuran being preferred. The reduction is carried out between about zero and about 100° C., preferably between about zero and about 65° C. when lithium aluminum hydride is employed. In many instances, e.g., when tetrahydrofuran is employed, the reaction can be carried out advantageously at the boiling point of the reaction mixture.

The 1,3,4,5-tetrahydropyrrolo[4,3,2-de]quinolines having the formula:

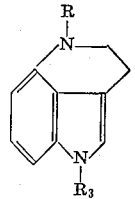

V wherein R has the value represented above and $R_3$ is alkyl of one to four carbon atoms, inclusive, can be prepared by reacting 1,3,4,5 - tetrahydropyrrolo[4,3,2 - de] quinoline or the compounds of Formula III or IV with an alkyl halide in the presence of an alkaline condensing agent, e.g., alkali-metal amides or alkali-metal hydrides.

The novel compounds of the present invention have been found to possess valuable pharmacological activity. Illustratively, the compounds of the present invention exhibit sedative and anti-inflammatory activity.

When used in therapy, the novel compounds of the invention in free base form or in the form of pharmacologically acceptable acid addition or quaternary ammonium salts, can be combined with solid or liquid pharmaceutical carriers and formulated in the form of tablets, powder packets or capsules, using starch and like excipients, or dissolved or suspended in suitable solvents or vehicles, for oral or parenteral administration.

In addition, the novel compounds of the present invention exhibit high absorption of radiation in the wavelength range of 280–300 millimicrons and, accordingly, can be employed as effective sun screens when incorporated in suitable vehicles such as transparent film-forming compositions and oils.

The novel acid addition salts of the present invention can be prepared by reacting a secondary or tertiary amine of Formula I

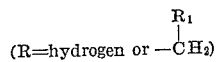
(R=hydrogen or $-\overset{R_1}{\underset{|}{C}H_2}$)

with a stoichiometric quantity of an acid, e.g., hydrochloric, hydrobromic, sulfuric, acetic, tartaric, citric, or the like.

The aforesaid secondary and tertiary amines can be reacted with fluosilicic acid to form amine fluosilicate salts useful as mothproofing agents according to U.S. Patents 1,915,334 and 2,075,359. These amines also form salts with thiocyanic acid, which salts can be condensed with formaldehyde according to U.S. Patents 2,425,320 and 2,606,155 to form amine thiocyanate-formaldehyde condensation products useful as pickling inhibitors.

The novel quaternary ammonium salts of the present invention can be prepared by reacting a tertiary amine of Formula I

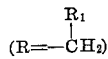
(R=$-\overset{R_1}{\underset{|}{C}H_2}$)

in an inert solvent, e.g., acetone, methanol, acetonitrile, and the like, with a suitable quaternary ammonium salt-forming compound such as methyl iodide, ethyl bromide, butyl iodide, benzyl chloride, dimethyl sulfate, and the like.

The following examples are illustrative of the process and products of the present invention, but are not to be construed as limiting.

*Example 1.—1,3,4,5-tetrahydropyrrolo[4,3,2-de] quinoline*

(A) *4-nitrogramine methosulfate.*—A solution of 500 mg. (2.28 millimoles) of 4-nitrogramine and 0.03 ml. of acetic acid in 10 ml. of dry tetrahydrofuran was added slowly at 25° C., under nitrogen, to a stirred solution of 1.07 ml. of dimethyl sulfate and 0.03 ml. of acetic acid in 5 ml. of dry tetrahydrofuran. After three hours, crude product had separated from the mixture as a gummy precipitate. The solvent was removed by decantation and the product was washed with ether and treated with methanol. The methanol soluble material was crystallized from methanol-ether to yield 264 mg. of 4-nitrogramine methosulfate. An analytical sample prepared by recrystallization from methanol-ether melted between 157–159° C.

*Analysis.*—Calcd. for $C_{13}H_{19}N_3O_6S$: C, 45.21; H, 5.55; N, 12.16; S, 9.29. Found: C, 45.66; H, 5.49; N, 12.05; S, 9.24.

(B) *4-nitro-3-indoleacetonitrile.*—A mixture of 4.58 g. (13.3 millimoles) of 4-nitrogramine methosulfate, 140 ml. of a sodium acetate-acetic acid buffer (3.0 g. of acetic acid and 4.1 g. of sodium acetate dissolved in 500 ml. of water) and 300 ml. of ether, contained in a 500-ml. hydrogenation bottle, was treated with 4.58 g. of sodium cyanide. The bottle was sealed and agitated at about 25° C. for 11.25 hours. The reaction mixture was extracted several times with a mixture of ethyl acetate and ether. The combined extracts were washed with saturated sodium chloride solution, dried over anhydrous sodium sulfate, and concentrated under reduced pressure. Crystallization of the residue from ethyl acetate yielded 1.73 g. (64.7%) of 4-nitro-3-indoleacetonitrile. An analytical sample prepared by recrystallization from ethyl acetate melted between 199–200° C.

*Analysis.*—Calcd. for $C_{10}H_7N_3O_2$: C, 59.70; H, 3.51; N, 20.89. Found: C, 59.48; H, 3.42; N, 20.84.

(C) *1,3,4,5 - tetrahydropyrrolo[4,3,2-de]quinoline.*—A mixture of 4.0 g. (19.9 millimoles) of 4-nitro-3-indoleacetonitrile, 2.0 g. of 10% palladium-on-carbon catalyst, and 300 ml. of ethyl acetate (purified by passing through neutral alumina) was hydrogenated for 2.6 hours in a Parr hydrogenator at an initial pressure of 45 pounds per square inch. The temperature was raised from 25° C. at the start of the reaction to about 70° C. at the end. The mixture was filtered through diatomaceous earth and yielded a colorless filtrate which was concentrated under reduced pressure and under nitrogen to yield a colorless gum. A benzene solution of this material was absorbed on 100 g. of silica gel in a chromatographic column. Elution of the column with a 10% solution of ether in benzene yielded 1.31 g. (41.4%) of 1,3,4,5-tetrahydropyrrolo [4,3,2-de]quinoline as white crystals. On recrystallization from methanol-water, an analytical sample melted between 132.5–133.5° C.

The ultraviolet absorption spectrum (in 95% ethanol) showed λmax. 227 mμ ($\epsilon$=33,650); 277 mμ ($\epsilon$=6,600); 290 mμ ($\epsilon$=5,950); 299 mμ ($\epsilon$=6,050).

*Analysis.*—Calcd. for $C_{10}H_{10}N_2$: C, 75.92; H, 6.37; N, 17.71. Found: C, 76.11; H, 6.18; N, 17.32.

*Example 2.—5-methyl-1,3,4,5-tetrahydropyrrolo-[4,3,2-de]quinoline*

(A) *5 - formyl - 1,3,4,5 - tetrahydropyrrolo[4,3,2-de] quinoline.*—Formic acetic anhydride was prepared by mixing 9.45 ml. of acetic anhydride with 3.98 ml. of 98% formic acid. To 3 ml. (21.4 millimoles of formic acetic anhydride) of this solution, cooled in an ice bath, was slowly added 1.54 g. (9.73 millimoles) of 1,3,4,5-tetrahydropyrrolo[4,3,2-de]quinoline. The resulting solution was allowed to stand at about 25° C. for five hours. Ether was added and the solution was allowed to stand for 18 hours. The solution was then washed successively with water, dilute ammonium hydroxide, and saturated sodium chloride solution, and was then dried over anhydrous sodium sulfate and was concentrated under reduced pressure under nitrogen. Crystallization of the residue from ethyl acetate-Skellysolve B (mixture of hexanes) yielded 1.72 g. (95.1%) of 5-formyl-1,3,4,5-tetrahydropyrrolo-[4,3,2-de]quinoline. An analytical sample prepared by recrystallization from ethyl acetate-Skellysolve B melted between 131–134° C.

The ultraviolet absorption spectrum (in 95% ethanol) showed λmax. 225 mμ ($\epsilon$=31,750); 294 mμ ($\epsilon$=9,800); with an inflection at 288 mμ ($\epsilon$=9,500).

*Analysis.*—Calcd. for $C_{11}H_{10}N_2O$: C, 70.95; H, 5.41. Found: C, 70.83; H, 5.04.

In the same manner as shown above, 5-acetyl-1,3,4,5-tetrahydropyrrolo[4,3,2-de]quinoline, 5-propionyl-1,3,4,5-tetrahydropyrrolo[4,3,2-de]quinoline and 5-butyryl-1,3,4,5-tetrahydropyrrolo[4,3,2-de]quinoline are prepared by substituting acetic anhydride, propionic anhydride and butyric anhydride, respectively, for formic acetic anhydride.

(B) *5 - methyl - 1,3,4,5 - tetrahydropyrrolo[4,3,2-de] quinoline.*—To an ice cold mixture of 1.5 g. of powdered lithium aluminum hydride in 200 ml. of dry tetrahydrofuran was added 1.688 g. (9.08 millimoles) of 5-formyl-1,3,4,5-tetrahydropyrrolo[4,3,2-de]quinoline. The resulting mixture was stirred at 25° C. under nitrogen, for 20 hours. The mixture was then refluxed for one hour, cooled in an ice bath, and treated successively with 1.5 ml. of water, 1.5 ml. of 15% aqueous sodium hydroxide solution, and 4.5 ml. of water. The mixture was filtered through diatomaceous earth and the filter cake was washed with ether. Concentration of the combined filtrate and washings under nitrogen and reduced pressure yielded an oil which was dissolved in benzene and chromatographed on silica with 2% ether-benzene to yield 1.39 g. (89.3%) of 5-methyl-1,3,4,5-tetrahydropyrrolo[4,3,2-de]quinoline.

An analytical sample prepared by recrystallization from benzene-Skellysolve B melted between 121–123° C.

The ultraviolet absorption spectrum (in 95% ethanol) showed λmax. 227 mμ (ε=33,850); 282 mμ (ε=7,250); 299 mμ (ε=7,900).

Analysis.—Calcd. for $C_{11}H_{12}N_2$: C, 76.71; H, 7.02; N, 16.27. Found: C, 76.74; H, 7.39; N, 15.96.

In the same manner as shown above, 5-ethyl-1,3,4,5-tetrahydropyrrolo[4,3,2-de]quinoline, 5 - propyl - 1,3,4,5-tetrahydropyrrolo[4,3,2-de]quinoline and 5-butyl-1,3,4,5-tetrahydropyrrolo[4,3,2-de]quinoline are prepared by substituting 5 - acetyl - 1,3,4,5 - tetrahydropyrrolo[4,3,2 - de]quinoline, 5-propionyl-1,3,4,5-tetrahydropyrrolo[4,3,2-de]quinoline and 5-butyryl-1,3,4,5-tetrahydropyrrolo[4,3,2-de]quinoline, respectively, for 5-formyl-1,3,4,5-tetrahydropyrrolo[4,3,2-de]quinoline.

Example 3.—1-methyl-1,3,4,5-tetrahydropyrrolo[4,3,2-de]quinoline hydrochloride

To a stirred solution of 2.0 g. (12.65 millimoles) of 1,3,4,5-tetrahydropyrrolo[4,3,2-de]quinoline in 150 ml. of dry dimethylformamide was added, under nitrogen, 600 mg. of 53.2% mineral oil suspension of sodium hydride (13.30 millimoles of sodium hydride). After 1.5 hours, methyl iodide (0.828 ml.; 13.3 millimoles) was added to the mixture. The resulting solution was allowed to stand at 25° C. for two hours and was then poured into about 1 liter of water. The mixture was saturated with sodium chloride and extracted with ether. The ether extract was washed with saturated sodium chloride solution, dried over anhydrous potassium carbonate and concentrated to yield, after preliminary silica gel chromatography, 2.059 g. of a mixture of 1-methyl-1,3,4,5-tetrahydropyrrolo[4,3,2-de]quinoline and 1,3,4,5-tetrahydropyrrolo[4,3,2-de]quinoline. Careful chromatography of this mixture on silica gel with 0.5% ether-benzene resulted in 1-methyl-1,3,4,5-tetrahydropyrrolo[4,3,2-de]quinoline, an ethyl acetate solution of which was treated with methanolic hydrogen chloride to produce 1-methyl-1,3,4,5-tetrahydropyrrolo[4,3,2-de]quinoline hydrochloride. On crystallization from methanol-ethyl acetate, the hydrochloride weighed 1.049 g. (39.7%). A sample of the hydrochloride was recrystallized three times from methanol-ethyl acetate for analysis and melted between 220–235° C. (sublimation and decomposition in a sealed capillary).

The ultraviolet spectrum (in 95% ethanol) showed λmax. 228 mμ (ε=32,900); 284 mμ (ε=5,700); 310 mμ (ε=7,050); with an inflection at 303 mμ (ε=6,500).

Analysis.—Calcd. for $C_{11}H_{13}ClN_2$: C, 63.31; H, 6.28; N, 13.43; Cl, 16.99. Found: C, 63.46; H, 6.39; N, 13.42; Cl, 17.08.

Example 4.—1-ethyl-1,3,4,5-tetrahydropyrrolo[4,3,2-de]quinoline hydrobromide

In the same manner as shown in Example 3, 1-ethyl-1,3,4,5-tetrahydropyrrolo[4,3,2-de]quinoline was prepared by substituting ethyl iodide for methyl iodide. 1-ethyl-1,3,4,5 - tetrahydropyrrolo[4,3,2-de]quinoline hydrobromide was prepared by reacting 1-ethyl-1,3,4,5-tetrahydropyrrolo[4,3,2-de]quinoline with hydrobromic acid.

Example 5.—1,5-dipropyl-1,3,4,5-tetrahydropyrrolo[4,3,2-de]quinoline acetate

In the same manner as shown in Example 3, 1,5-dipropyl-1,3,4,5-tetrahydropyrrolo[4,3,2-de]quinoline was prepared by substituting 5-propyl-1,3,4,5-tetrahydropyrrolo[4,3,2-de]quinoline and propyl iodide for 1,3,4,5-tetrahydropyrrolo[4,3,2-de]quinoline and methyl iodide. 1,5-dipropyl-1,3,4,5-tetrahydropyrrolo[4,3,2-de]quinoline acetate was prepared by reacting 1,5-dipropyl-1,3,4,5-tetrahydropyrrolo[4,3,2-de]quinoline with acetic acid.

Example 6.—1-butyl-1,3,4,5-tetrahydropyrrolo[4,3,2-de]quinoline citrate

In the same manner as shown in Example 3, 1-butyl-1,3,4,5-tetrahydropyrrolo[4,3,2-de]quinoline was prepared by substituting butyl iodide for methyl iodide. 1-butyl-1,3,4,5-tetrahydropyrrolo[4,3,2-de]quinoline citrate was prepared by reacting 1-butyl-1,3,4,5-tetrahydropyrrolo[4,3,2-de]quinoline with citric acid.

Example 7.—1-ethyl-5-methyl-1,3,4,5-tetrahydropyrrolo[4,3,2-de]quinoline hydrochloride In the same manner as shown in Example 3, 1-ethyl-5-methyl-1,3,4,5-tetrahydropyrrolo[4,3,2-de]quinoline was prepared by substituting 5-methyl-1,3,4,5-tetrahydropyrrolo[4,3,2-de]quinoline and ethyl iodide for 1,3,4,5-tetrahydropyrrolo[4,3,2-de]quinoline and methyl iodide. 1-ethyl - 5-methyl-1,3,4,5-tetrahydropyrrolo[4,3,2-de]quinoline hydrochloride was prepared by reacting 1-ethyl-5-methyl-1,3,4,5-tetrahydropyrrolo[4,3,2-de]quinoline with hydrochloric acid.

Example 8.—5-methyl-1,3,4,5-tetrahydropyrrolo[4,3,2-de]quinoline methiodide

Methyl iodide was added to a solution of 5-methyl-1,3,4,5-tetrahydropyrrolo[4,3,2-de]quinoline in acetonitrile. The mixture was allowed to stand for 24 hours and the resulting 5-methyl-1,3,4,5-tetrahydropyrrolo[4,3,2-de]quinoline methiodide was recovered by filtration.

In the same manner, 5-ethyl-1,3,4,5-tetrahydropyrrolo[4,3,2-de]quinoline ethobromide, 1,5-dipropyl-1,3,4,5-tetrahydropyrrolo[4,3,2-de]quinoline benzyl chloride, and 5 - butyl - 1,3,4,5-tetrahydropyrrolo[4,3,2-de]quinoline methosulfate were prepared by reacting 5-ethyl-1,3,4,5-tetrahydropyrrolo[4,3,2-de]quinoline and ethyl bromide; 1,5 - dipropyl - 1,3,4,5-tetrahydropyrrolo[4,3,2-de]quinoline and benzyl chloride; and 5-butyl-1,3,4,5-tetrahydropyrrolo[4,3,2-de]quinoline and dimethyl sulfate.

I claim:

1. A compound selected from the group consisting of (1) 1,3,4,5-tetrahydropyrrolo[4,3,2-de]quinolines having the formula:

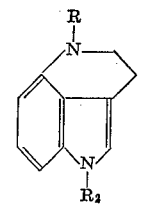

wherein R is selected from the group consisting of hydrogen,

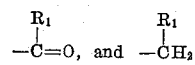

wherein $R_1$ is selected from the group consisting of hydrogen and alkyl of one to three carbon atoms, inclusive, $R_2$ is selected from the group consisting of hydrogen and alkyl of one to four carbon atoms, inclusive, and (2) acid addition salts.

2. A 1,3,4,5-tetrahydropyrrolo[4,3,2-de]quinoline having the formula:

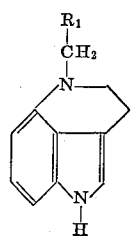

wherein $R_1$ is selected from the group consisting of hydrogen and alkyl of one to three carbon atoms, inclusive.

3. A 1,3,4,5-tetrahydropyrrolo[4,3,2-de]quinoline having the formula:

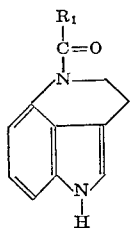

wherein $R_1$ is selected from the group consisting of hydrogen and alkyl of one to three carbon atoms, inclusive.

4. 1,3,4,5-tetrahydropyrrolo[4,3,2-de]quinoline.

5. 5 - methyl-1,3,4,5-tetrahydropyrrolo[4,3,2-de]quinoline.

6. 1 - methyl-1,3,4,5-tetrahydropyrrolo[4,3,2-de]quinoline hydrochloride.

7. 5 - formyl-1,3,4,5-tetrahydropyrrolo[4,3,2-de]quinoline.

References Cited
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,425,320 | 8/1947 | Hill | 252—149 |
| 2,606,155 | 8/1952 | Hill | 252—149 |
| 2,749,353 | 6/1956 | Kornfeld et al. | 260—285.5 XR |

OTHER REFERENCES

Burger: Medicinal Chemicals, 2d. Ed., Interscience, 1960, pp. 42–43.

ALEX MAZEL, *Primary Examiner.*

DONALD G. DAUS, *Assistant Examiner.*